D. B. JONES.
METHOD OF TREATING ZINC ORE.
APPLICATION FILED JUNE 22, 1914. RENEWED JUNE 10, 1918.
1,292,330.
Patented Jan. 21, 1919.
3 SHEETS—SHEET 2.
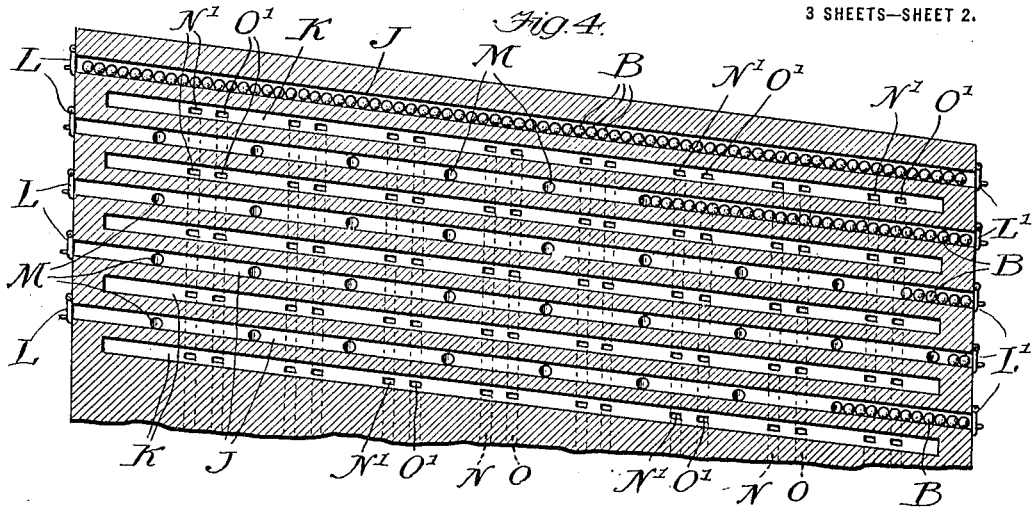
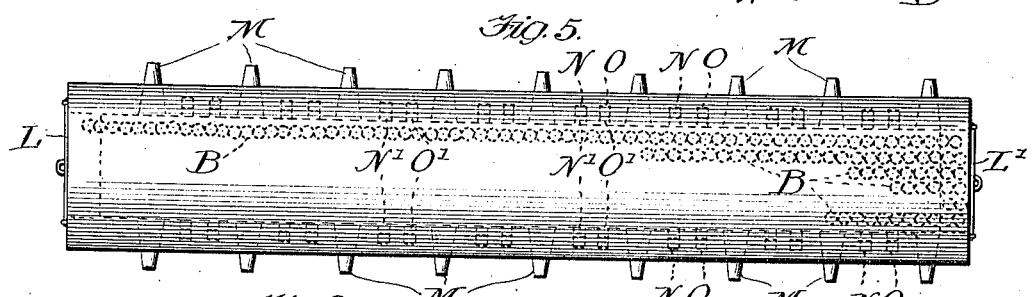
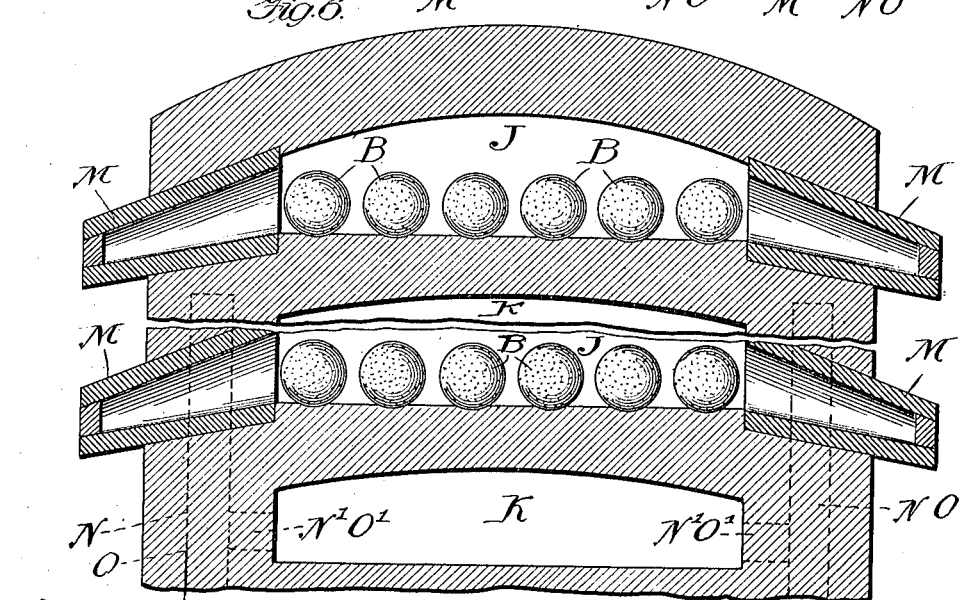

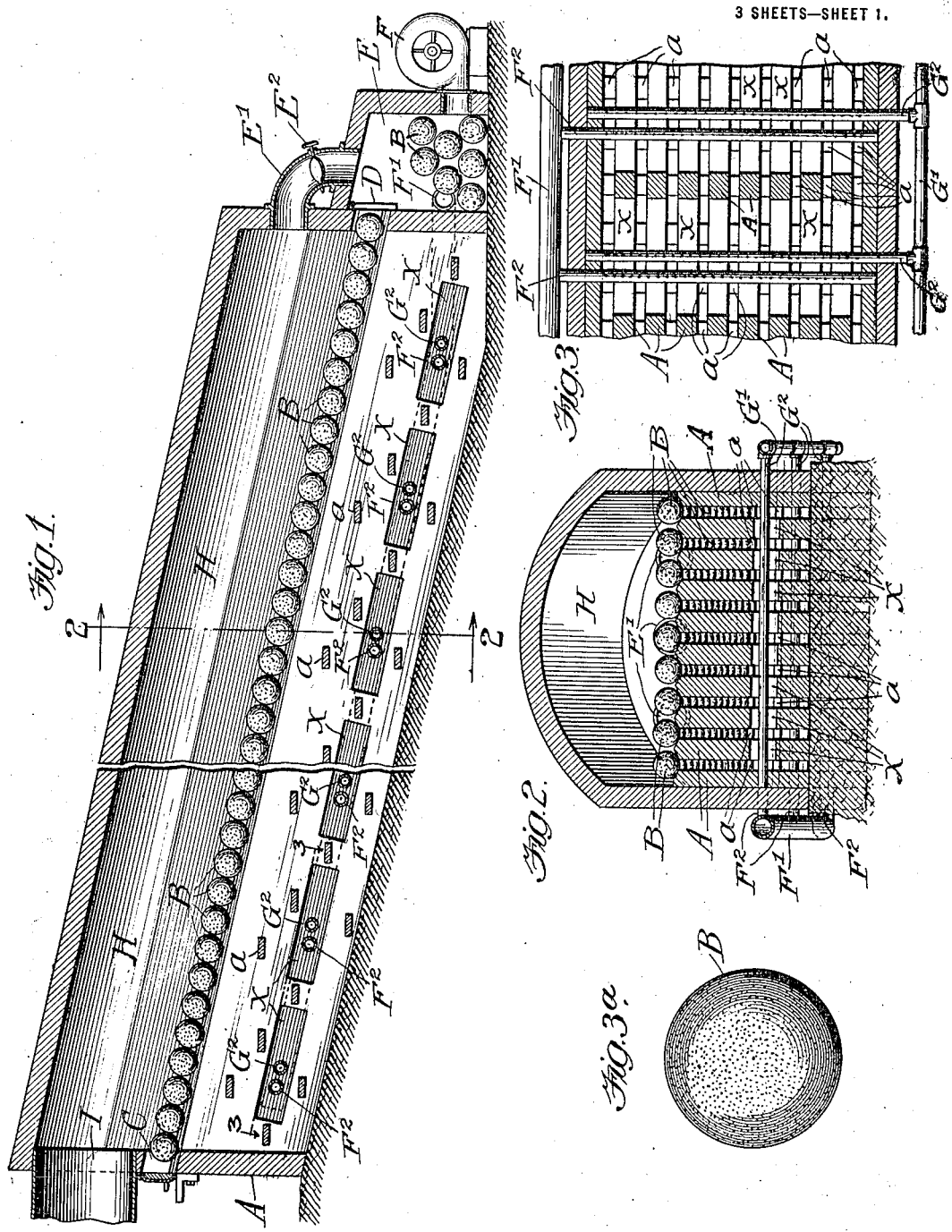

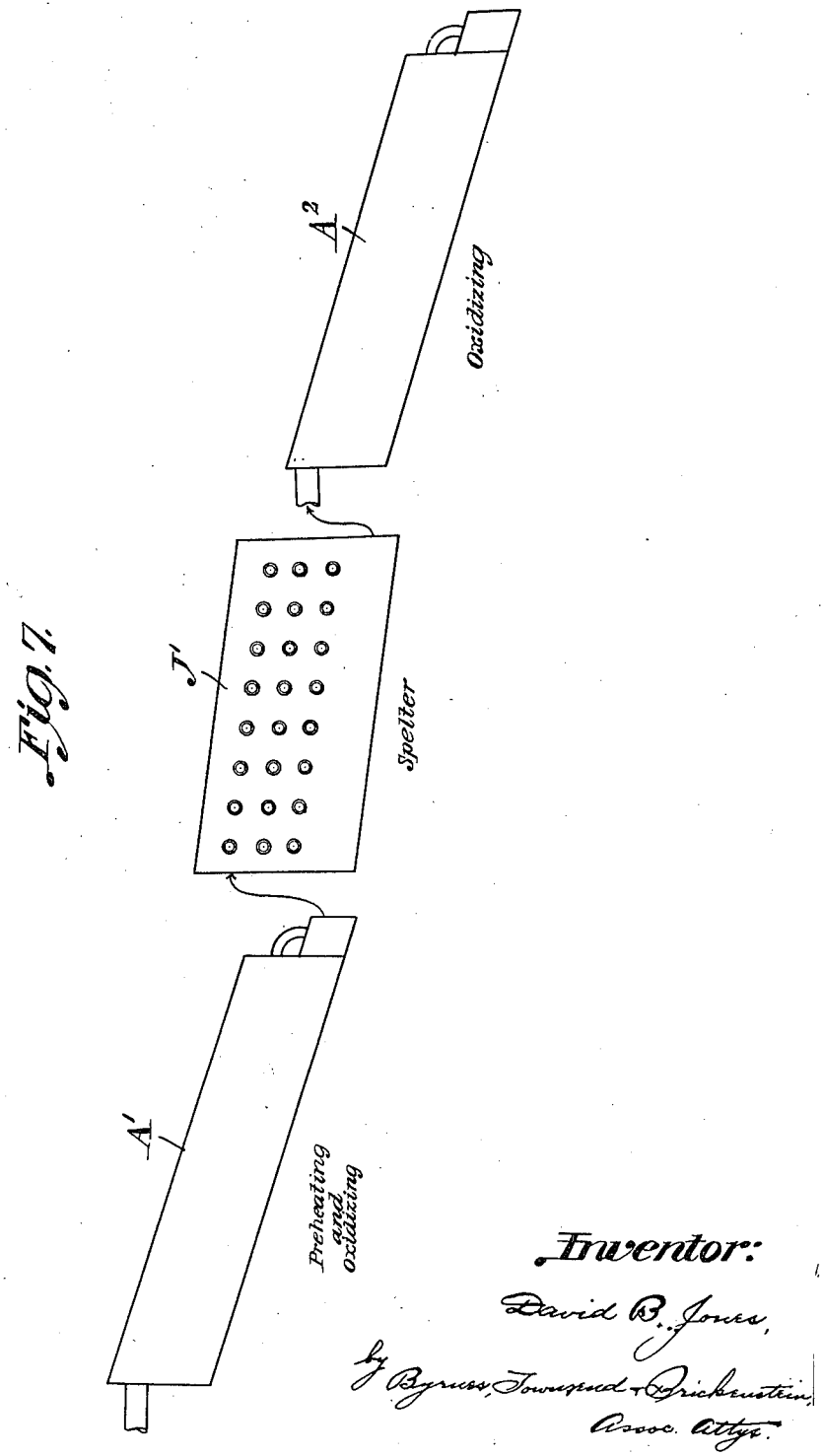

UNITED STATES PATENT OFFICE.

DAVID B. JONES, OF CHICAGO, ILLINOIS.

METHOD OF TREATING ZINC ORE.

1,292,330.   Specification of Letters Patent.   Patented Jan. 21, 1919.

Application filed June 22, 1914, Serial No. 846,466. Renewed June 10, 1918. Serial No. 239,290.

*To all whom it may concern:*

Be it known that I, DAVID B. JONES, a citizen of the United States, residing at Chicago, in the county of Cook and State of Illinois, have invented certain new and useful Improvements in Methods of Treating Zinc Ore, of which the following is a description, reference being had to the accompanying drawings, forming a part of this specification.

My invention has for its object increased efficiency and economy in the treatment of zinc ore, both for the production of "spelter" and for the production of zinc oxid, and consists in submitting the zinc ore in a novel form and manner, and in a novel furnace, and in a novel sequence of operations, to the necessary heat for the production of such spelter and oxid, all as hereinafter more fully set forth and explained.

In the accompanying drawings Figure 1 is a longitudinal vertical section of a furnace for the treatment of zinc ore in the novel manner contemplated by my invention, for the production of zinc oxid; Fig. 2 a vertical cross section of the same on the line 2—2 of Fig. 1; Fig 3 a horizontal sectional detail on the line 3—3 of Fig. 1; Fig. 3ᵃ a side view or elevation of one of the spherical briquets into which the zinc ore is formed for treatment in the furnace shown in Figs. 1 and 2; Fig. 4 a vertical longitudinal section of a spelter furnace adapted to the treatment of zinc ore in the manner contemplated by my invention for the production of spelter; Fig. 5 a top plan view of the same with certain of its interior parts and contents shown in dotted lines; Fig. 6 an enlarged cross-sectional detail of the upper part of the furnace as shown in Fig. 4; and Fig. 7 is a diagram of a system of such furnaces.

The same letters of reference are used to indicate corresponding parts in the several views.

As the basis for the novel treatment of the ore contemplated by my invention, I preferably form the finely powdered ore into spherical briquets of suitable size, such as shown in detail in Fig. 3ᵃ. It is important for the successful practice of my invention that these briquets shall retain their form, and shall not disintegrate and break down, under the heat to which they are subjected for the production of spelter and zinc oxid, and to this end they may be made up in any suitable manner that may prove most efficient for that purpose. One means to this end may be the addition to the finely ground ore and its reducing agent of a percentage of finely powdered fire clay of a high grade, such as bauxite for instance, the best percentage of such added clay being determined by experiment and test. Sufficient water, or a solution of common salt, is added to the mixture to form a plastic mass, from which the spherical briquets are formed in suitable molds, and submitted to a high pressure, for the purpose of producing briquets of the greatest compactness and solidity possible. After being thus formed the briquets are permitted to dry slowly, in a suitable kiln, at a moderate temperature, say for a period of 24 hours or longer at a temperature of 220 degrees Fahrenheit. After the briquets have been thus dried they may be given a thin coating of an emulsion of fire clay or other suitable material, to still further increase the refractoriness of the surface portion of the briquets and their consequent stability and resistance to disintegration.

The briquets thus formed are passed through the furnace in a continuous series, and caused to travel therethrough by their own gravity, to which end the furnace is provided with inclined tracks or ways to receive them, along which they travel by gravity from one end of the furnace to the other. In the zinc oxid furnace illustrated in Fig. 1 there are provided nine of such inclined tracks or ways, extending from end to end of the furnace, above the checkerwork through which the air and gas for heating the furnace are supplied. Such inclined tracks or ways are there shown as being formed by and upon the upper ends of the longitudinal walls or piers A of such checkerwork (supported laterally by interposed blocks or bricks *a*), the upper edges of the adjacent walls being beveled off or inclined toward each other, so as to form longitudinal grooves or tracks for the reception and guidance of the spherical briquets B. These briquets are introduced at the upper left hand end of the furnace through doors at C, and travel thence downward upon the inclined ways to the lower end of the furnace, where their exit from the heating chamber is controlled by doors D. For most efficient operation the furnace will be kept substantially filled with briquets, extending in longitudinal rows from the entrance doors C to the exit doors D. At suitable intervals of time the doors D will be opened by the attendant and one or more of the briquets at the lower ends of the several rows, which have had their zinc content driven off during their passage through the furnace, will be permitted to escape from the heating chamber and drop into the supplemental chamber E, where they are allowed to remain temporarily before being removed, while a blast of air is blown through (between) them by a blower F, such blast of air being heated by its passage through the briquets and being directed thence into a pipe or other conduit F' leading along the side of the furnace and having branches F² extending transversely through openings X in the checker-work and provided with escape orifices in their upper sides, as shown in Figs. 2 and 3. Such preheated air, and the gas supplied to the checker-work from the pipe G' and branch pipes G² (also extending through the openings X) are ignited in the checker-work, and the flames of combustion, passing up and around and between the rows of briquets upon the top of the checker-work, subject the briquets to a sufficient degree of heat to drive off the zinc content of the briquets in the form of vapor, which fills the space or chamber H above the briquets. The quantity of air supplied through the conduit F' and its branches F², for combustion with the gas supplied through the pipe G' and its branches G² is so regulated and controlled that it will be insufficient to oxidize the zinc content of the briquets as it is driven off from the latter, such zinc content passing off and filling the chamber H in the form of vapor, as stated. Sufficient additional air is then supplied to the chamber H to oxidize the zinc vapor therein and convert it into zinc oxid. This additional air may be supplied from any suitable source, and be directed into the lower right hand end of the chamber H. I have shown it, in the present instance, as being supplied from the chamber E to which the blower F is connected, through a pipe or conduit E' (or a plurality of such conduits) connecting the upper end of the chamber E with the end of the chamber H, a damper or valve E² in the conduit being employed for regulating and controlling the supply of air so admitted to the chamber H. This additional quantity of air, admitted to the chamber H and there mingling with the gas and products of combustion passing upward from the checker-work and with the zinc vapor, will burn up any unconsumed gas and carbonaceous material and will cause the zinc vapor to be converted into zinc oxid as stated. Such oxid is withdrawn from the chamber H, at its upper left hand end, along with the products of combustion and other contents of the chamber H, through an exhaust pipe I, whence it is led through a system of piping to the collecting bags in the usual manner.

It promotes the efficiency of the treatment of the briquets B in the furnace shown to preheat them before their introduction into the furnace, and this may be done in a variety of ways. One economical way of so heating the briquets prior to their introduction into the furnace would be to pass them through a heating chamber subjected to the heat of the contents of the chamber H as withdrawn through the pipe I. Such contents of the chamber H, as withdrawn from said chamber, are heated to a very high temperature, so that by passing them around or in contact with a suitably arranged heating chamber through which the briquets B are passed before being introduced into the furnace, such chamber may be readily heated to a sufficient degree to properly preheat the briquets. I prefer, however, to preheat the briquets in a spelter furnace, in which the greater part of the zinc content of the briquets will be distilled off and condensed into spelter, and the briquets be thereafter passed through the furnace shown in Figs. 1 and 2 merely for the purpose of subjecting them to a higher degree of heat and driving off their remaining zinc content and collecting it in the form of zinc oxid, in the manner above explained. Indeed, inasmuch as it likewise promotes the efficiency of the treatment of the briquets in the spelter furnace to preheat them to a moderate degree before introducing them into such furnace, I further contemplate the subjecting of the briquets to three successive heating operations, for the production of spelter and zinc oxid, to which end I contemplate first passing the briquets through a furnace similar to that shown in Figs. 1 and 2, but there subjecting them to only a sufficient degree of heat, say a maximum of 800 degrees C., to properly preheat them for introduction into a suitable spelter furnace without purposely driving off any of their zinc content, but if any of their zinc content should be driven off during their passage through the furnace of Figs. 1 and 2, for such purpose, it could be oxidized and collected in the manner above explained. A suitable system of furnaces for carrying out the above embodiment of my invention is illustrated diagrammatically in Fig. 7, in which A' represents the preheating furnace, J' the spelter furnace and A² indicates the oxidizing furnace. A suitable spelter furnace for the reception and treatment of the briquets is indicated in Figs. 4, 5 and 6. For the production of spelter, by the distillation and subsequent condensation of the zinc content of the ore, it is of course essential that the retorts or distillation chambers shall be heated by external application of heat, and that the materials for and products of combustion shall not enter the distillation chambers. I have therefore provided the furnace shown in Figs. 4, 5 and 6 with a series of alternate distillation and heating chambers, located one above the other and extending longitudinally from one end of the furnace to the other, such chambers (or the distillation chambers at least) being inclined to a sufficient degree to cause the spherical briquets to travel by gravity from one end of the furnace to the other. In the construction shown, the uppermost chamber J is a distillation chamber, the next below it a heating chamber, K, the next a distillation chamber, and so on to the lowermost one, which is a heating chamber. The briquets B are introduced into the distillation chambers J, at the upper left hand ends of the latter, through openings in the furnace wall controlled by doors L, and their exit from the opposite end of the chambers is controlled by similar doors L'. The floors or bottom walls of the chambers J are provided upon their upper surfaces with longitudinal grooves or tracks for the reception and guidance of the spherical briquets B, which travel lengthwise of the chambers, along such tracks or grooves, as in the furnace of Figs. 1 and 2. Each of the distillation chambers J is provided at suitable intervals along its sides (see Fig. 5) with condensers M, similar in their general character and operation to the condensers commonly employed at the outer ends of the retorts in retort-furnaces employed in the distillation of zinc ore.

The heating chambers K are heated by the combustion in them of air and gas supplied by air flues N and ports N' and gas flues O and O', there being a series of flues of each character leading upward through the side walls of the furnace, at suitable intervals in the length thereof and between the vertical rows of condensers M, and each flue opening by a lateral port into one side of each of the heating chambers K. Figs. 4 and 5. (The air and gas flues and ports are directly behind one another in the view shown in Fig. 6, so that only one flue and port appear on each side.) Each of the chambers K therefore has a series of air ports and a series of gas ports opening into it along both of its opposite sides. The air and gas flues may lead through the usual checker-work to the reversing valves of the ordinary regenerative furnace, so that the air and gas for combustion may be delivered into the chambers K at one side thereof and the products of combustion be withdrawn through the ports and flues at the opposite side, and such operation be reversed at regular intervals as usual.

After the briquets have had the greater portion of their zinc content driven off in their passage through the furnace of Figs. 4, 5, and 6, and collected in the form of spelter in the condensers M, the briquets may be withdrawn from the furnace at proper intervals, through the doors L', and be thence transferred to and introduced into the furnace of Figs. 1 and 2, for the purpose of there subjecting them to a higher degree of heat, for the purpose of expelling their remaining zinc content and converting it into and collecting it as zinc oxid, in the manner explained.

After the zinc content of the briquets has been driven off as completely as possible, and collected in the form of spelter or zinc oxid, or both, the briquets may be charged into an ordinary upright smelting furnace for the purpose of recovering their contents of lead, silver and other metals than zinc, usually contained in zinc ore. The formation of the zinc ore into briquets, and the treatment of them in the manner described, not only facilitates the recovery of the zinc content of the briquets, in the form of spelter or oxid or both, but it prevents to a large degree the lead and silver contents of the ore being driven off with its zinc content, and causes them to be retained in the briquets, from which they may be readily recovered in the subsequent smelting of the latter. This not only facilitates the recovery of the lead and silver contents of the briquets, but it also prevents the lead content of the ore being driven off and passing over with the zinc content and mingling with the latter in the spelter or oxid recovered, with consequent detriment to the latter.

So far as I am aware the above described method of recovering zinc oxid from zinc ore, by forming the ore into briquets and passing them through a furnace in which the briquets are subjected to a sufficient degree of heat to expel their zinc content in the form of vapor, and then supplying an additional quantity of air to the vapor to oxidize it and convert it into zinc oxid, is entirely novel, and this feature of my invention is not limited to the particular form of briquets shown, nor to the passage of them through the furnace by gravity. On the contrary they may be of any desired or suitable form, and may be passed through the furnace in any suitable manner and by any suitable means, as for instance, by being moved horizontally through a horizontal furnace by suitable mechanical means, so long as they are subjected in the furnace to a sufficient degree (only) of heat to drive off their zinc content in the form of vapor, and such vapor is then converted into zinc oxid in the manner explained.

Having thus fully described my invention, I claim:

1. The herein described method of recovering zinc oxid from zinc ore, consisting in forming the zinc ore into briquets with suitable reducing material, passing said briquets through the heating chamber of a suitable furnace, in which the briquets are subjected to a sufficient degree of heat to expel their zinc content substantially in the form of metallic vapor, and supplying air to the space or chamber containing such vapor for the purpose of converting it into zinc oxid; substantially as described.

2. The herein described method of recovering zinc oxid from zinc ore, consisting in forming the zinc ore into spherical briquets with suitable reducing material, causing said briquets to travel by gravity along an inclined way of the heating chamber of a suitable furnace, subjecting the briquets in said chamber to a sufficient degree of heat to expel their zinc content in the form of vapor, and admitting a supply of air to the space or chamber containing such vapor for the purpose of oxidizing said vapor and converting it into zinc oxid; substantially as described.

3. The herein described method of treating zinc ore for the recovery of its zinc content in the form of spelter and zinc oxid, consisting in forming the ore into briquets, passing the briquets with suitable reducing material through a suitable spelter furnace, in which they are subjected to a sufficient degree of heat for a sufficient length of time to expel the greater portion of their zinc content in the form of vapor, condensing and collecting said vapor in the form of spelter, then passing said briquets through an oxid furnace in which the briquets are subjected to a sufficiently higher temperature for a sufficient length of time to expel their remaining zinc content substantially in the form of metallic vapor, and supplying air to the space or chamber containing said vapor to convert it into zinc oxid; substantially as described.

4. The herein described method of treating zinc ore for the recovery of its zinc content in the form of spelter and oxid, consisting in forming the zinc ore into briquets with suitable reducing material, passing said briquets through an oxid furnace and submitting them to a temperature approximately that at which their zinc content begins to pass off in the form of vapor, supplying air to the space or chamber containing any vapor that may be driven off, to convert it into zinc oxid, and collecting such oxid in the usual manner, then passing the briquets through a suitable spelter furnace, in which they are subjected to a sufficient degree of heat for a sufficient length of time to expel the greater portion of their zinc content in the form of vapor, condensing and collecting said vapor as spelter, then passing the briquets through an oxid furnace in which they are subjected to a higher degree of heat for a sufficient length of time to expel their remaining zinc content substantially in the form of metallic vapor, and supplying air to the space or chamber containing such vapor to convert it into zinc oxid; substantially as described.

DAVID B. JONES.

Witnesses:
EDWARD RECTOR,
ROBERT DOBBERMAN.